(12) United States Patent
Matsushita

(10) Patent No.: US 8,827,346 B2
(45) Date of Patent: Sep. 9, 2014

(54) PROTECTOR

(71) Applicant: Suzuki Motor Corporation, Hamamatsu (JP)

(72) Inventor: Hiroki Matsushita, Hamamatsu (JP)

(73) Assignee: Suzuki Motor Corporation, Shizuoka-ken, Hamamatsu-shi (JP)

( * ) Notice: Subject to any disclaimer, the term of this patent is extended or adjusted under 35 U.S.C. 154(b) by 0 days.

(21) Appl. No.: 13/729,955

(22) Filed: Dec. 28, 2012

(65) Prior Publication Data

US 2013/0168986 A1 Jul. 4, 2013

(30) Foreign Application Priority Data

Jan. 4, 2012 (JP) ................................ 2012-000094

(51) Int. Cl.
*B62J 17/00* (2006.01)
*B62D 27/04* (2006.01)
*B62J 17/02* (2006.01)
*B62J 23/00* (2006.01)

(52) U.S. Cl.
CPC ............. *B62D 27/04* (2013.01); *B62J 17/02* (2013.01); *B62J 17/00* (2013.01); *B62J 23/00* (2013.01)
USPC ..................... 296/93; 296/181.1; 280/153.5

(58) Field of Classification Search
USPC .......... 296/1.03, 1.08, 78.1, 93, 146.9, 181.1, 296/181.2; 49/466; 180/219; 280/153.5
See application file for complete search history.

(56) References Cited

U.S. PATENT DOCUMENTS

| 4,010,976 | A | * | 3/1977 | Shields | 296/78.1 |
| 4,019,774 | A | * | 4/1977 | Tsukahara et al. | 296/78.1 |
| 4,066,291 | A | * | 1/1978 | Hickman | 296/78.1 |
| 4,130,315 | A | * | 12/1978 | Shields | 296/78.1 |
| 4,461,508 | A | * | 7/1984 | Ogishima | 296/78.1 |
| 4,479,676 | A | * | 10/1984 | Hayes | 296/78.1 |
| 5,109,942 | A | * | 5/1992 | Akimori et al. | 180/219 |
| 7,731,263 | B2 | * | 6/2010 | Tanaka | 296/78.1 |
| 2004/0079573 | A1 | * | 4/2004 | Ohura | 180/218 |
| 2005/0146153 | A1 | * | 7/2005 | Keys | 296/78.1 |

FOREIGN PATENT DOCUMENTS

| JP | 57-53989 U | 3/1982 |
| JP | 01-233180 A | 9/1989 |
| JP | 06-135363 A | 5/1994 |

OTHER PUBLICATIONS

Extended European Search Report Application No. 13150052.2 dated Apr. 18, 2013.

* cited by examiner

*Primary Examiner* — Glenn Dayoan
*Assistant Examiner* — Jason S Daniels
(74) *Attorney, Agent, or Firm* — Barnes & Thornburg LLP

(57) ABSTRACT

A vehicle is provided with a protector for absorbing shock for a vehicle body cover to be attached to an outer edge portion of the vehicle body cover on an outer side of a vehicle body. The vehicle body cover is composed of a plurality of vehicle body cover parts which are coupled with each other so as to constitute the vehicle body cover, and the protector includes an attachment portion attached so as to straddle outer edge portions of adjacent vehicle body cover parts among a plurality of vehicle body cover parts.

10 Claims, 8 Drawing Sheets

PROTECTOR

This patent application claims priority to Japanese Patent Application No. 2012-000094, filed 4 Jan. 2012, the disclosure of which is incorporated herein by reference in its entirety.

BACKGROUND OF THE INVENTION

1. Field of the Invention

The present invention relates to a protector for a vehicle body cover of a vehicle such as motorcycle, and more particularly, to a protector that is attached to a vehicle body cover of a saddle-type vehicle.

2. Description of the Related Art

As such conventional type of protector for a vehicle body cover, there is known a rubber mold to be attached to an outer edge portion of a vehicle body cover (for example, disclosed in Patent Document 1 (Japanese Utility Model Laid-Open No. 57-53989)). The rubber mold of Patent Document 1 has an attachment portion of a groove shape in a cross-section, and is formed to have a long shape so as to follow an outer edge portion of a vehicle body cover. The rubber mold protects the outer edge portion of the vehicle body cover by fitting an attachment groove to the outer edge portion of the vehicle body cover.

Further, a naked-type motorcycle may have a small vehicle body cover, and, depending on the demands related to the design, the vehicle body cover may be formed by having a plurality of vehicle body cover parts joined together. With the naked-type motorcycle, the rubber mold such as disclosed in the Patent Document 1 is attached to the outer edge portion of each vehicle body cover portion to thereby narrow the clearance between each vehicle body cover portion and other portions or parts such as a fuel tank, thus improving an outer appearance.

With respect to such a vehicle body cover, since the vehicle body cover is divided into a plurality of parts, it is difficult to secure the rigidity of each vehicle body cover part. The low rigidity of the vehicle body cover parts may cause vibration at the outer edge portion of each vehicle body cover part, resulting in causing of abrasion or unpleasant hammering noise between the parts. In this case, although it may be conceivable to increase the number of coupling points of the vehicle body cover parts to secure the rigidity, it is difficult for a small vehicle body cover to provide a large number of coupling points.

SUMMARY OF THE INVENTION

The present invention is made in consideration of the circumstance described above, and an object thereof is to provide a protector capable of effectively restricting the vibration at the outer edge portion of each vehicle body cover part even with a small number of coupling points of the vehicle body cover parts.

The above and other objects can be achieved according to the present invention by providing a protector for absorbing shock for a vehicle body cover, that is to be attached to an outer edge portion of the vehicle body cover on an outer side of a vehicle body, wherein the vehicle body cover is composed of a plurality of vehicle body cover parts which are coupled with each other so as to constitute the vehicle body cover, and the protector includes an attachment portion attached so as to straddle outer edge portions of adjacent vehicle body cover parts among a plurality of vehicle body cover parts.

In a preferred embodiment, it may be desired that the attachment portion includes a first attachment portion and a second attachment portion which are attached to the respective outer edge portions of the adjacent vehicle body cover parts, external configurations of the outer edge portions of the adjacent vehicle body cover parts are formed, at a connecting portion of the first and second attachment portions, in such a manner as to be recessed toward a boundary of the adjacent vehicle body cover parts, and the connecting portion of the first and second attachment portions is fixed at the boundary of the adjacent vehicle body cover parts by a fixing portion provided to one of the adjacent vehicle body cover parts.

According to the characteristic structures of the present invention mentioned above, since the adjacent vehicle body cover parts are connected to each other by the protector at the outer edge portions that are easily vibrated, the vibration of the outer edge portions of the vehicle body cover parts can be effectively suppressed. Accordingly, any abrasion between the vehicle body cover parts and unpleasant hammering noise can be suppressed. In addition, by causing the protector to serve the function of connecting the adjacent cover parts, the coupling strength between the vehicle body cover parts can be increased, and the rigidity can be secured even with a small number of coupling points.

Furthermore, according to the above mentioned characteristic structure, the connecting portion of the first attachment portion and the second attachment portion is attached along the outer edge portions, formed into a recessed shape, of the adjacent vehicle body cover parts. According to such structure, the connecting portion of the first attachment portion and the second attachment portion may easily become the starting point for falling off, but since the connecting portion of the present embodiment is fixed to the vehicle body cover part, the protector can be effectively prevented from falling off from the vehicle body cover.

According to the protector of the present invention, the vibration at the outer edge portion of each vehicle body cover part can be effectively suppressed even when the number of coupling points of the vehicle body cover parts is small.

The nature and further characteristic features of the present invention will be made clearer from the following descriptions made with reference to the accompanying drawings.

BRIEF DESCRIPTION OF THE DRAWINGS

In the accompanying drawings:

FIGS. 4A to 4C are enlarged views of a first cover portion to be protected according to the present embodiment, in which FIG. 4A is a view seen from an arrow IVA in FIG. 3A, and FIGS. 4B and 4C are sectional views taken along the line IVB-IVB and IVC-IVC in FIG. 4A, respectively;

FIGS. 5A and 5B are enlarged views of a connecting portion between first and second cover portions according to the present embodiment, in which FIG. 5B is a view viewed from an arrowed direction VB in FIG. 5A;

FIGS. 8A and 8B are partial enlarged views of the attached state of the protector according to the present embodiment to the vehicle body cover, in which FIG. 8B is a sectional view taken along the line VIIIB-VIIIB in FIG. 8A.

DESCRIPTION OF THE PREFERRED EMBODIMENT

Hereinafter, a present embodiment will be described in detail with reference to the appended drawings.

Further, it is to be noted that, in the following, an explanation will be given assuming a case where a protector of the present invention is applied to a touring motorcycle. However, the application target is not limited to the touring motorcycle and to be applicable to other types of motorcycles or saddle-type vehicles such as all-terrain vehicles (ATV).

Figure 1:
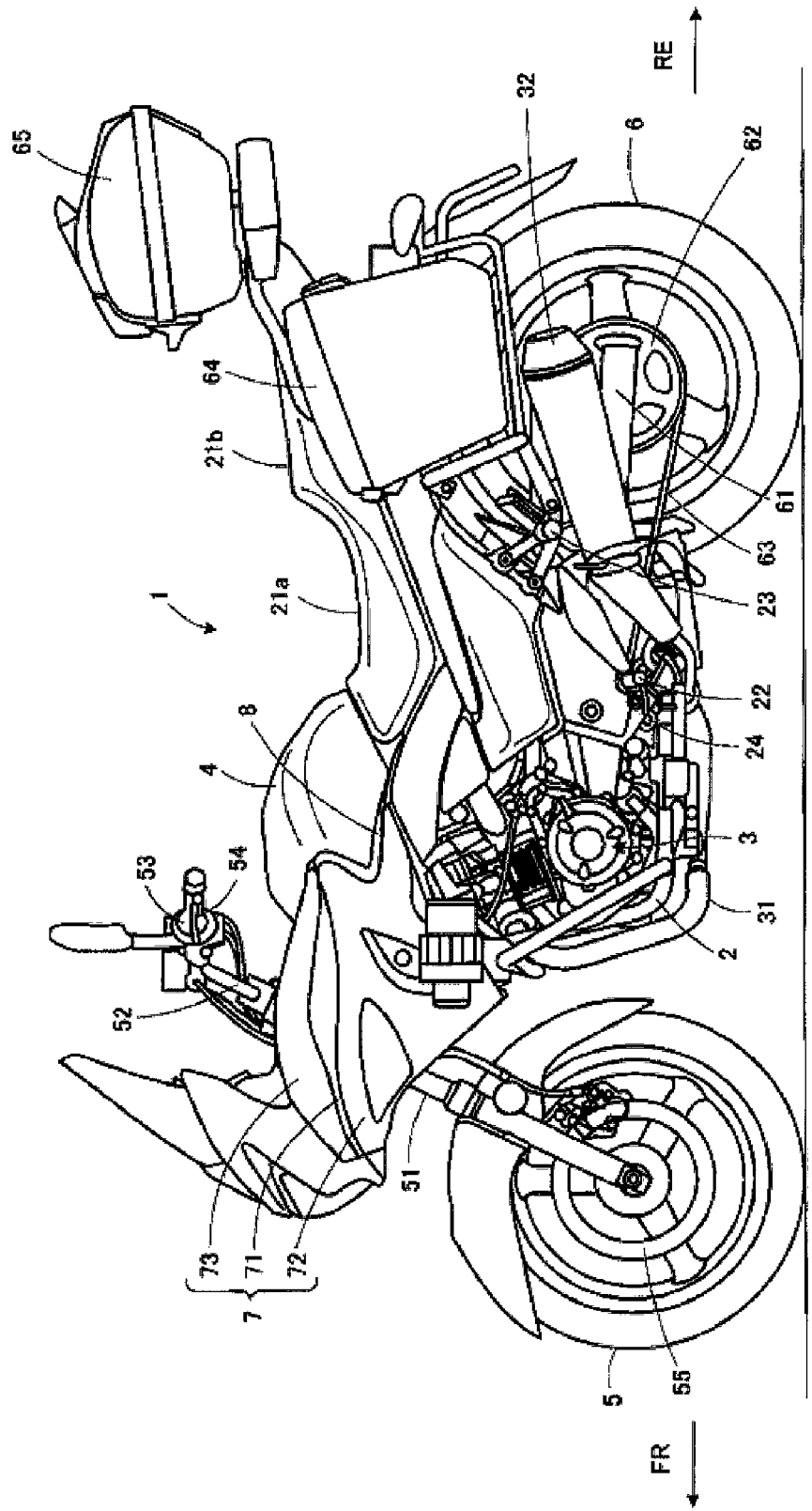
FIG. 1 is a left side view of a motorcycle provided with a protector according to a present embodiment.

It is further to be noted that terms "upper", "lower", "right", "left" and like terms indicating directions will be used herein with reference to the illustrated states on the drawings or in a motorcycle standing state as shown in FIG. 1, and in addition, in the drawings, the front of a vehicle body is shown with an arrow FR, and the rear of the vehicle body is shown with an arrow RE.

First, an overall configuration of a motorcycle 1 according to the present embodiment will be described with reference to FIGS. 1, 2A and 2B.

As shown in FIG. 1, the motorcycle 1 is constructed by being provided with various types of covers as the exterior or outer configuration of a vehicle body attached to a double cradle vehicle body frame 2 made of steel or aluminum alloy. The double cradle vehicle body frame 2 is mounted with a power unit and respective components constituting an electrical system.

An engine 3 is mounted inside the double cradle structure at substantially the front half of the vehicle body frame 2. In a side view, the engine 3 is supported on a frame member surrounding the engine 3 via an engine mount. A fuel tank 4 is provided on the upper surface of the cradle portion of the vehicle body frame 2 so as to be positioned above the engine 3.

A rider's seat 21a and a pillion 21b are linked at the rear side of the fuel tank 4. The rider's seat 21a and the pillion 21b are supported by a seat rail at substantially the rear half portion of the vehicle body frame 2. Footrests 22 and 23 are provided below the rider's seat 21a and the pillion 21b in a corresponding arrangement.

A gear change pedal 24 is provided in front of the footrest 22 for the rider on the left side of the vehicle body, and a brake pedal, not shown, for a rear wheel 6 is provided in front of the footrest 22 for the rider on the right side of the vehicle body.

A front fork 51 is rotatably connected to a header pipe of the vehicle body frame 2. A handlebar 52 is provided to the front fork 51, and grips 53 are attached to both ends of the handlebar 52. A clutch lever 54 is arranged at the front left side of the handlebar 52, and a brake lever, now shown, for a front wheel 5 is arranged at the front right side of the handlebar 52. The front wheel 5 is turnably supported below the front fork 51, and a disc brake 55 is provided to the front wheel 5.

A rear swing arm 61 is connected, to be swingable in the vertical direction, at an intermediate position in the longitudinal direction of the vehicle body frame 2, and a suspension, not shown, is installed between the vehicle body frame 2 and the rear swing arm 61. The rear wheel 6 is turnably supported at the rear portion of the rear swing arm 61.

A driven sprocket 62 is provided on the left side of the rear wheel 6, and the power of the engine 3 is transferred to the rear wheel 6 by means of a drive chain 63. A disc brake, not shown, for the rear wheel 6 is provided on the right side of the rear wheel 6.

In addition, pannier cases 64 and 65 are provided on the left and right sides of the rear wheel 6 (i.e., vehicle body) and behind the pillion 21b. The engine 3 (engine unit) is composed of a parallel 4-cylinder engine and a transmission, for example, and is suspended from the vehicle body frame 2.

Air is taken into the engine 3 via an intake duct, not shown, and the air and the fuel are mixed at a fuel injector, not shown, and supplied to a combustion chamber. The exhaust gas after combustion in the combustion chamber is exhausted from a muffler 32 via an exhaust pipe 31 extending downward from the engine 3.

Figure 2A:
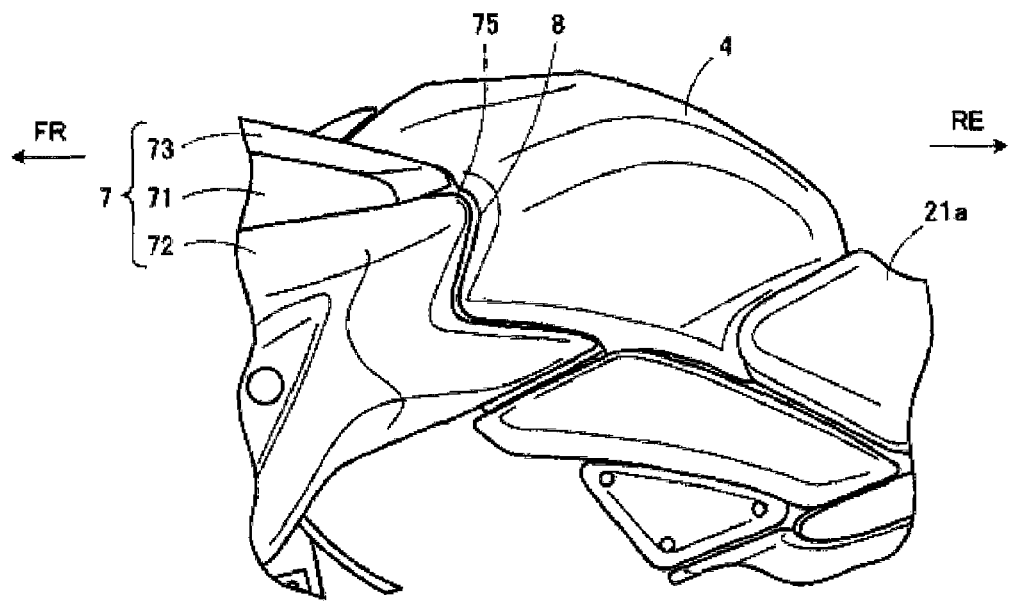
FIGS. 2A and 2B are views, in an enlarged scale, showing a fuel tank and peripheral portions thereof of the motorcycle of FIG. 1.
Figure 2B:
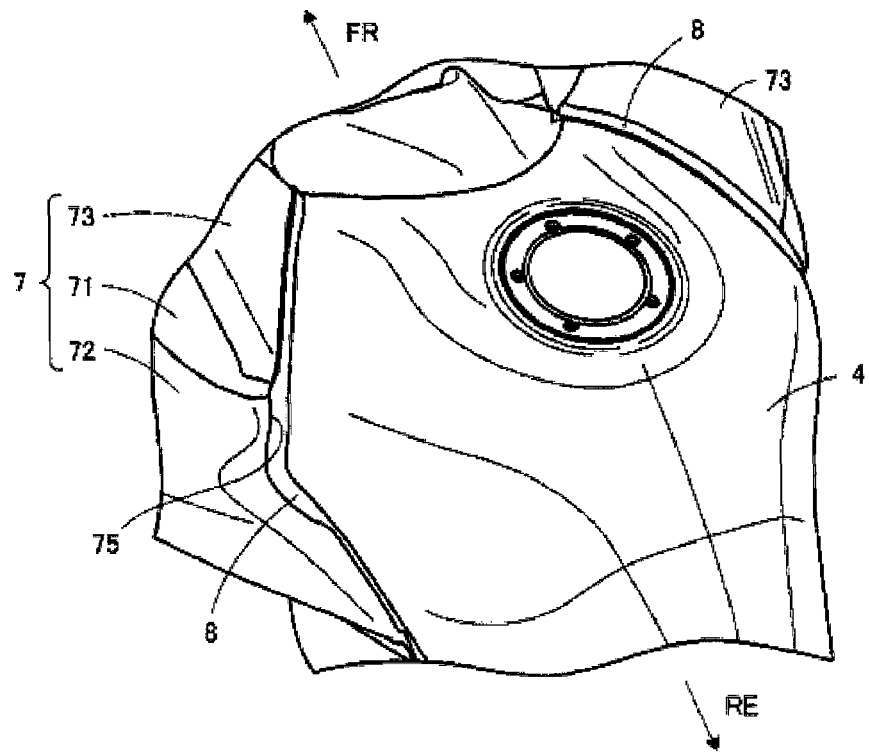

As shown in FIGS. 2A and 2B, various covers are attached at the periphery of the fuel tank 4 so as to cover the front end part of the vehicle body frame 2. A vehicle body cover 7 is provided in front of the fuel tank 4, the vehicle body cover 7 including an upper vehicle body cover 71 (a vehicle body cover part), a lower vehicle body cover 72 (a vehicle body cover part) and a vehicle body cover panel 73 (a vehicle body cover part). The header pipe and a main frame of the vehicle body frame 2 are covered by the vehicle body cover 7. An outer edge portion 75, on the fuel tank 4 side, of the vehicle body cover 7 is formed into a substantially crank shape when viewed from the side. The vehicle body cover 7 is arranged such that there is a predetermined clearance between the substantially crank-shaped outer edge portion 75 and the fuel tank 4.

The vehicle body cover 7 and the fuel tank 4 are arranged with a clearance therebetween, and they may temporarily be deformed due to an external force applied at a time when they are gripped with the knees of the rider or at the time of toppling over, for example. Accordingly, in order to obviate such matter, a rubber protector 8 is applied to the outer edge portion 75 of the vehicle body cover 7 according to the present embodiment so as to prevent the direct contact between the vehicle body cover 7 or the fuel tank 4 due to the deformation of these members. The protector 8 functions as a shock absorber between the outer edge portion 75 of the vehicle body cover 7 and the fuel tank 4.

Therefore, damage or abrasion between the components or members of the motorcycle is suppressed, and the durability thereof and the appearance protection performance are increased. The protector 8 functions not only as a shock absorber, but also as a blinding material for covering the clearance. According to this structure, since a clearance of uneven width between the outer edge portion 75 of the vehicle body cover 7 and the fuel tank 4 is covered by the protector 8, the external appearance can be effectively improved. Particularly, the clearance at the upper portion of the vehicle body cover 7, that is, the clearance between the outer edge portion 75 of the vehicle body cover panel 73 and the fuel tank 4, which is easily visible to the rider, can be hidden.

In the following, the protector 8 will be described with reference to FIGS. 3A and 3B, 4A to 4C, and 5A and 5B.

Figure 3A:
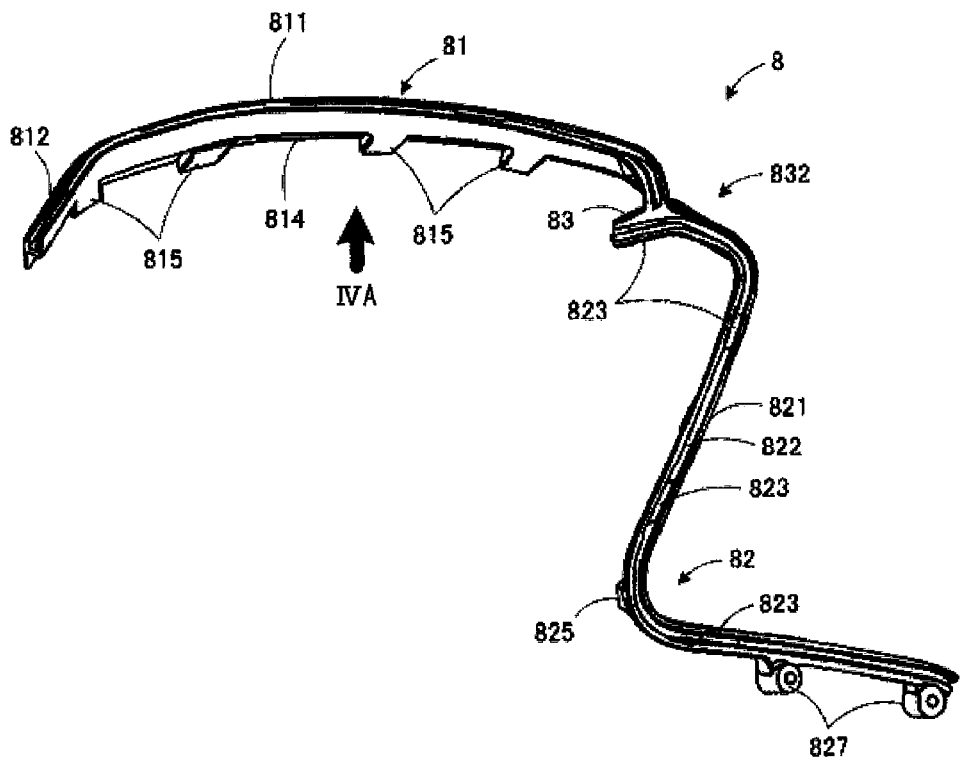
FIGS. 3A and 3B are perspective views, in an enlarged scale, of a protector of the motorcycle according to the present embodiment.
Figure 3B:
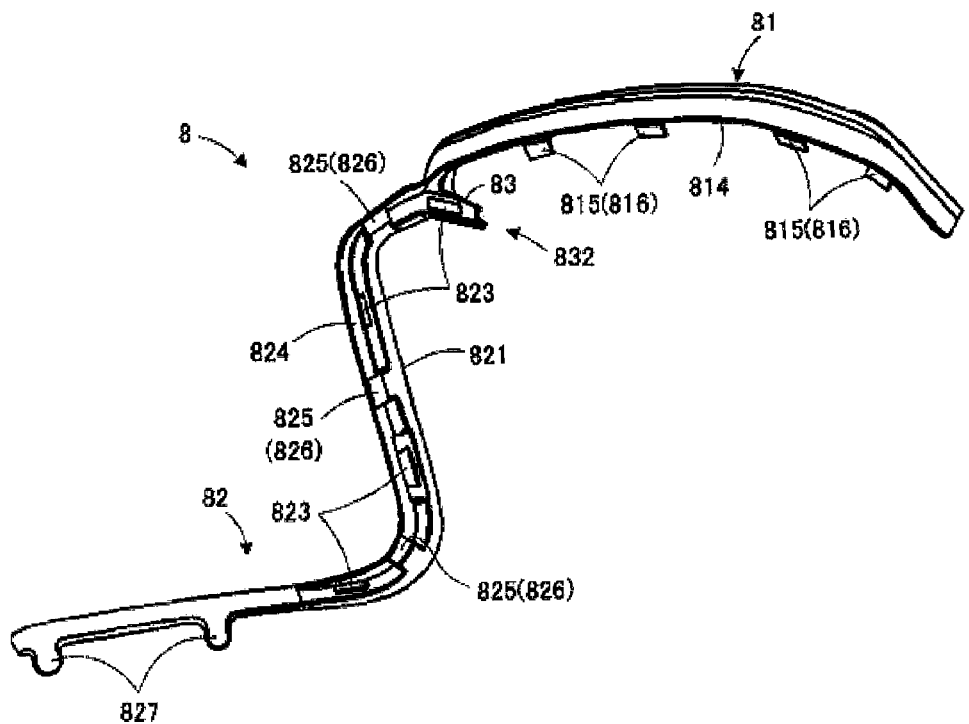
Figure 4A:
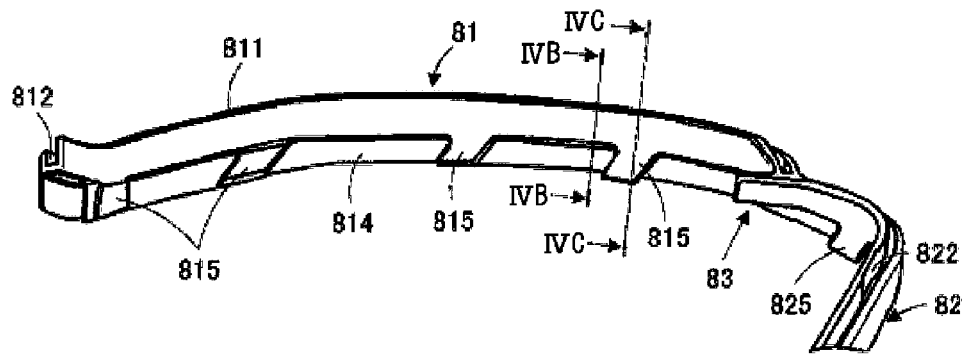
Figure 4B:
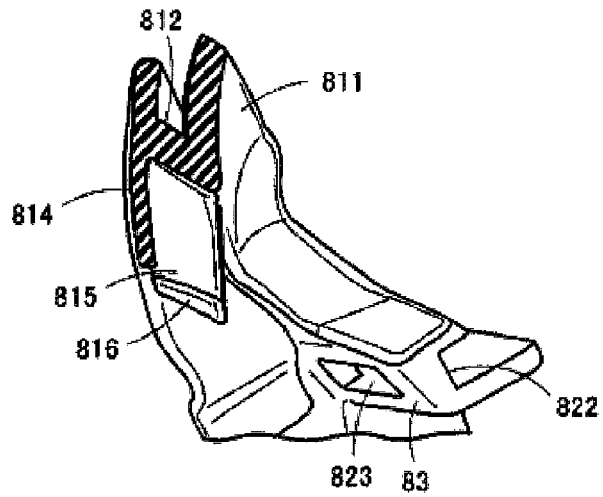
Figure 4C:
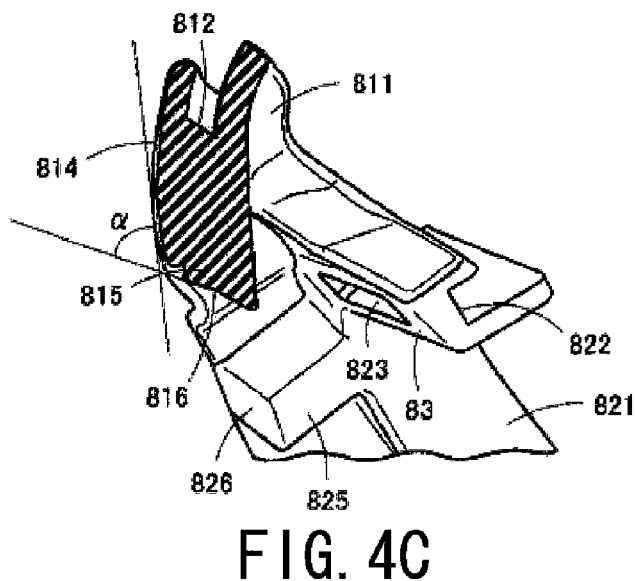
Figure 5A:
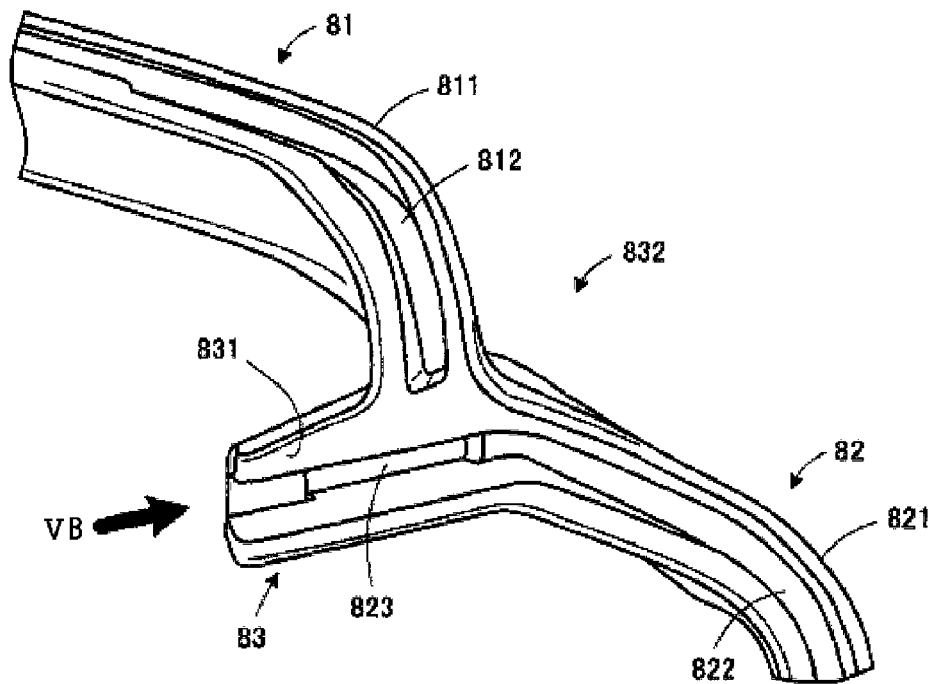
Figure 5B:
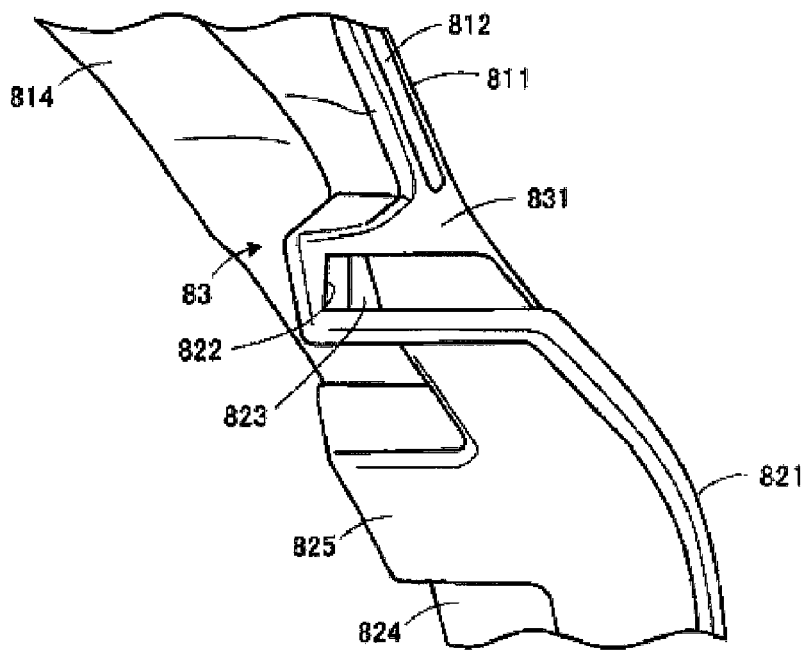

FIGS. 3A and 3B are perspective views of the protector 8 seen from inside and outside thereof according to the present embodiment, FIGS. 4A to 4C are enlarged views of a first cover portion 81, and FIGS. 5A and 5B are enlarged views of a connecting portion between first and second cover portions 81 and 82.

As shown in FIGS. 3A and 3B, the protector 8 is formed to have a long shape by connecting a first cover portion 81 that follows the outer edge portion of the vehicle body cover panel 73 and a second cover portion 82 that follows the outer edge portion of the lower vehicle body cover 72. Since the first and second cover portions 81 and 82 are integrally formed, the coupling strength of the vehicle body cover panel 73, the upper vehicle body cover 71 and the lower vehicle body cover 72 is increased, and the rigidity of the entire vehicle body cover 7 is also increased. In addition, according to the increase in the rigidity of the vehicle body cover 7, the vibration of each member is reduced, and the abrasion or unpleasant hammering noise due to contact between the constituting components or members can be suppressed.

The first cover portion 81 includes a long attachment portion (first attachment portion) 811 that follows an outer edge portion 731 (see FIG. 6), on the side of the fuel tank 4, of the vehicle body cover panel 73. The attachment portion 811 has a groove shape in cross section, and has an attachment groove 812 for the outer edge portion 731 of the vehicle body cover panel 73 formed thereto along the extending direction. The groove width of the attachment groove 812 is formed to be slightly narrower than the thickness of the vehicle body cover panel 73. Accordingly, when the attachment groove 812 is fitted to the outer edge portion 731 of the vehicle body cover panel 73, the attachment degree and performance of the first cover portion 81 to the vehicle body cover panel 73 can be increased.

Moreover, a plurality of engaging holes, not shown, are provided to the bottom surface of the attachment groove 812 to prevent the attachment portion 811 from falling off from the vehicle body cover panel 73.

Furthermore, the first cover portion 81 is provided with a strip portion 814 at one end on the outer side of the vehicle body in a width direction orthogonal to the extending direction of the attachment portion 811.

Further, in FIG. 3A, since the first cover portion 81 is attached to the vehicle body cover panel 73 on the upper side of the vehicle body, the strip portion 814 is positioned at one end portion of the attachment portion 811 on the upper side of the vehicle body. The strip portion 814 protrudes, in a strip shape, from the attachment portion 811 toward the fuel tank 4, which is the counterpart, that is, toward the side opposite to the mounting direction of the attachment groove 812. The strip portion 814 has a strip width wider than the clearance between the outer edge portion 731 of the vehicle body cover panel 73 and the fuel tank 4.

According to the above structure, when the first cover portion 81 is attached to the vehicle body cover panel 73, the clearance between the outer edge portion 731 of the vehicle body cover panel 73 and the fuel tank 4 is covered by the strip portion 814. The clearance on the upper side of the vehicle body, which is easily visible to the rider, is hidden by the first cover portion 81, and the external appearance can be thereby improved. In addition, foreign matters can be prevented from entering from the outside by the strip portion 814 covering the clearance. The strip portion 814 formed in the manner mentioned above is reinforced from the inside by a plurality of reinforcing portions 815 arranged on the attachment portion 811 at a predetermined interval.

As shown in FIGS. 4A to 4C, the reinforcing portions 815 protrude at several positions in the extending direction of the attachment portion 811 so as to partially reinforce the strip portion 814. In the illustrated embodiment, thick reinforcing portions 815 are provided from the strip portion 814 positioned on the outer side of the vehicle body in the width direction of the attachment portion 811 to the other end positioned on the inner side of the vehicle body. The plurality of reinforcing portions 815 act as supporting pieces for the strip portion 814, which is long and has low rigidity, and suppress the inward and outward deformation of the strip portion 814 to an appropriate amount of deformation. Accordingly, the rolling up of the strip portion 814 is restricted by the reinforcement by the reinforcing portions 815, and the foreign matters can be prevented from entering from the outside.

Incidentally, since the fuel tank 4 is secured in a floating manner to the vehicle body frame 2, the clearance between the fuel tank 4 and the vehicle body cover 7 is made wide. The strip portion 814 is formed to have a wide strip width so as to be able to cover the clearance. In the present embodiment, even when the strip portion 814 is formed to have a wide strip width, deformation, such as rolling up, of the strip portion 814 can be restricted by the provision of the reinforcing portions 815. Furthermore, the rigidity of the strip portion 814 is maintained at an appropriate level by the partial reinforcement by the reinforcing portions 815, and thus, the shape of the strip portion 814 can be freely changed according to the shape of contact surface to the fuel tank 4.

In addition, the thick reinforcing portions 815 are arranged as props (columnar supports) between the outer edge portion 731 of the vehicle body cover panel 73 and the fuel tank 4, and the support rigidity of the protector 8 is increased. A contact surface 816 of the reinforcing portion 815 which is to contact the surface of the fuel tank 4 is tilted in such a manner as to prevent rolling up of the strip portion 814 to the outer side of the vehicle body.

Specifically, the external angle of the outer surface of the strip portion 814 on the outer side of the vehicle body and the contact surface 816 is to be an acute angle α. The rear end side in the rolling up direction will thereby hook to the surface of the fuel tank 4 at the time of the strip portion 814 rolling up.

Referring back to FIGS. 3A and 3B, the second cover portion 82 extends downward from the part connected to the first cover portion 81, curves along the way, and then extends toward the rear side. The second cover portion 82 includes a long attachment portion (second attachment portion) 821 that follows along an outer edge portion 721 (see FIG. 6), on the side of the fuel tank 4, of the lower vehicle body cover 72. The attachment portion 821 has a groove shape in section, and has an attachment groove 822 for the outer edge portion 721 of the lower vehicle body cover 72 formed thereto along the extending direction. The groove width of the attachment groove 822 is formed to be slightly narrower than the thickness of the lower vehicle body cover 72 so that the degree of attachment of the second cover portion 82 to the lower vehicle body cover 72 is increased. A plurality of engaging holes 823 are provided to the bottom surface of the attachment groove 822 to prevent the cover portion from falling off from the lower vehicle body cover 72.

Furthermore, a strip portion 824 is provided to the second cover portion 82 at a vertically extending portion, at one end on the outer side of the vehicle body in a width direction of the attachment portion 821. In addition, as shown in FIG. 3B, since the second cover portion 82 is to be attached to the outer edge portion 721 of the lower vehicle body cover 72 on the rear side of the vehicle body, the strip portion 824 is positioned at one end of the attachment portion 821, on the rear side of the vehicle body. The strip portion 824 protrudes, in a strip shape, from the attachment portion 821 toward the fuel tank 4, which is the counterpart, that is, toward the side opposite to the attachment direction of the attachment groove 822. The strip portion 824 has a strip width wider than the clearance between the outer edge portion 721 of the lower vehicle body cover 72 and the fuel tank 4.

The clearance between the outer edge portion 721 of the lower vehicle body cover 72 and the fuel tank 4 is thereby covered by the strip portion 824, and the external appearance is improved. Furthermore, the foreign matters from the outside can be prevented from entering by the location of the strip portion 824 covering the clearance.

In the present embodiment, the strip portion 824 is provided to the second cover portion 82 only at the vertically extending part and is not provided to a longitudinally extending portion. This is because the longitudinally extending portion of the second cover portion 82 is attached to the lower vehicle body cover 72, and is in the blind spot of the rider due to the location of the fuel tank 4. Incidentally, the strip portion 824 may be provided along the entire second cover portion 82 in the extending direction.

Like the strip portion 814 of the first cover portion 81, the strip portion 824 is reinforced from the inside by a plurality of reinforcing portions 825 arranged on the attachment portion 821 at a predetermined interval. The reinforcing portions 825 maintain the rigidity of the strip portion 824, which is long and of a low rigidity, at an appropriate rigidity, and allow deformation according to the shape of the contact surface to the fuel tank 4 while restricting great deformation such as rolling up of the strip portion 824.

In addition, like the reinforcing portion 815 of the first cover portion 81, the reinforcing portion 825 includes a contact surface 826, which is tilted in such a manner as to prevent the rolling up of the strip portion 824 to the outer side of the vehicle body. A pair of fixing portions 827 that is used at the time of installation to the lower vehicle body cover 72 is also provided in the longitudinally extending portion of the second cover portion 82.

As shown in FIGS. 5A and 5B, a protruding portion 83 is formed at the connecting portion between the first and second cover portions 81 and 82, extending along the boundary between the vehicle body cover panel 73 and the lower vehicle body cover 72.

The attachment groove 822 of the second cover portion 82 extends to the protruding portion 83, and the outer edge portion 721 of the lower vehicle body cover 72 is attached thereto. The attachment groove 822 of the second cover portion 82 and the attachment groove 812 of the first cover portion 81 are separated by a thick wall 831 of the protruding portion 83. Furthermore, the thick wall 831 of the protruding portion 83 is interposed between the outer edge portion 711 of the upper vehicle body cover 71 and the outer edge portion 721 of the lower vehicle body cover 72 (see FIG. 7).

In the manner mentioned above, the contact between the end portions of the vehicle body cover panel 73 and the lower vehicle body cover 72, and the contact between the end portions of the upper vehicle body cover 71 and the lower vehicle body cover 72 are prevented by the thick wall 831 of the protruding portion 83. Thus, the contact between the end portions of components or members that easily vibrate can be prevented near the protruding portion 83, and the abrasion and hammering noise can be also suppressed.

Furthermore, the periphery of the protruding portion 83 is formed into a substantially M-shape by the curved end portions of the first and second cover portions 81 and 82 which are joined with each other. This substantially M-shaped portion 832 easily greatly bends, which hence constitutes a starting point for falling off, and thus, the M-shaped portion 832 is to be fixed by a claw 723 of the lower vehicle body cover 72 described later.

Figure 6:
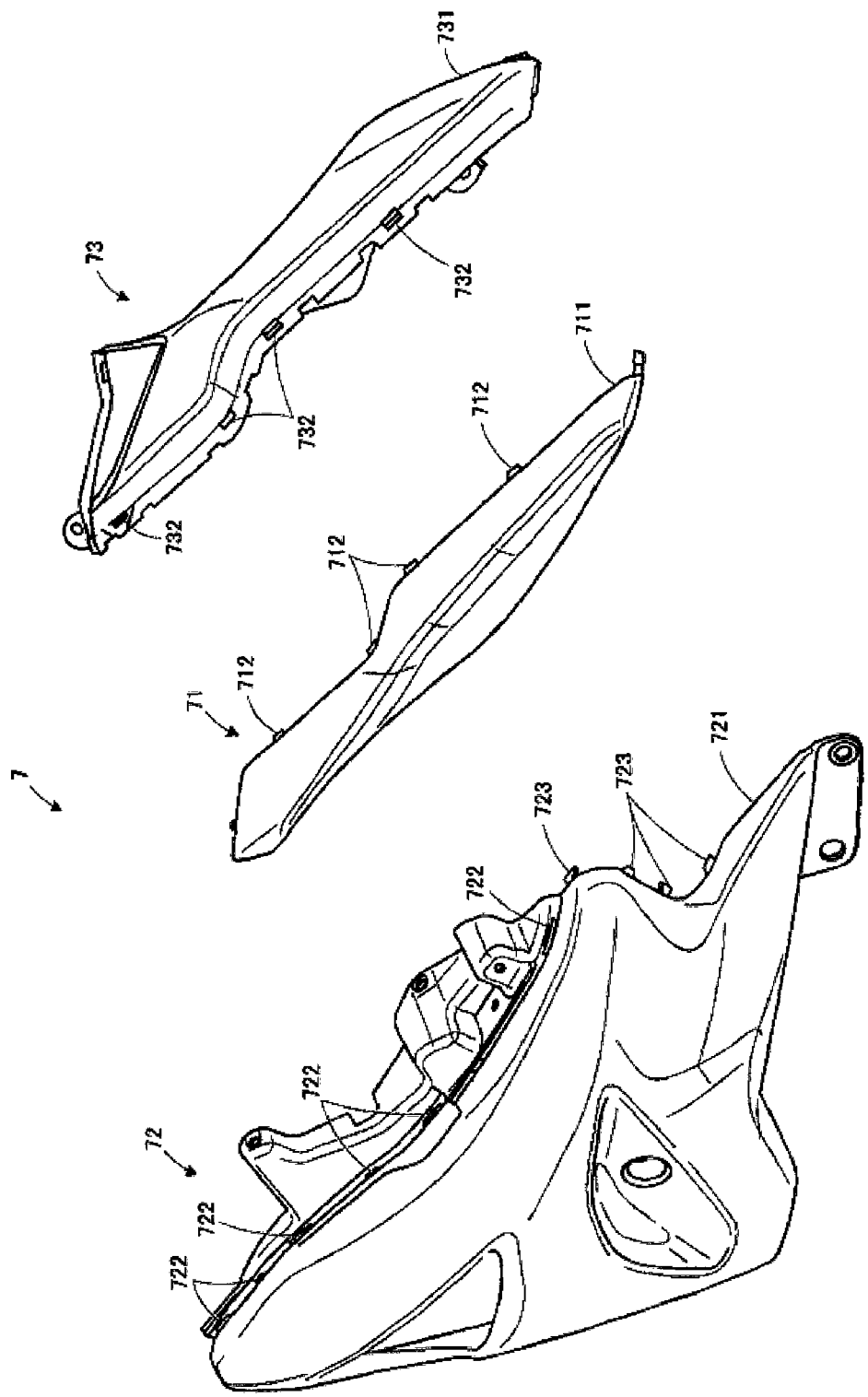
FIG. 6 is an exploded perspective view of a vehicle body cover according to the present embodiment.

Referring to FIG. 6, the vehicle body cover 7 to which the protector 8 is to be attached will be described. FIG. 6 is an exploded perspective view of the vehicle body cover 7 according to the present embodiment.

As shown in FIG. 6, the vehicle body cover 7 is formed by joining the vehicle body cover panel 73, the upper vehicle body cover 71 and the lower vehicle body cover 72. The vehicle body cover panel 73 forms the upper surface of the vehicle body at the front of the fuel tank 4. The lower vehicle body cover 72 and the upper vehicle body cover 71 form the sides of the vehicle body at the front of the fuel tank 4.

A plurality of connecting holes 732 are formed in the vehicle body cover panel 73 on the joining surface to the upper vehicle body cover 71. The vehicle body cover panel 73 and the upper vehicle body cover 71 are integrated by a plurality of connecting pieces 712 protruding from the outer circumferential edge of the upper vehicle body cover 71 which is inserted into the connecting holes 732 of the vehicle body cover panel 73.

A plurality of connecting holes 722 are formed in the lower vehicle body cover 72 on the joining surface to the upper vehicle body cover 71. The lower vehicle body cover 72 and the upper vehicle body cover 71 are integrated by the plurality of connecting pieces 712 protruding from the outer circumferential edge of the upper vehicle body cover 71 inserted into the connecting holes 722 of the lower vehicle body cover 72.

Accordingly, the vehicle body cover panel 73 and the lower vehicle body cover 72 are connected with the upper vehicle body cover 71 being interposed therebetween in a sandwiched fashion. The protector 8 for increasing the connecting strength of the covers 71 to 73 is attached to the outer edge portion of the integrated vehicle body cover 7 on the side of the fuel tank 4.

In this case, claws (claw portions) 733 (see FIG. 7) for preventing falling off that are to be engaged to engaging holes of the first cover portion 81 are provided to the outer edge portion 731 of the vehicle body cover panel 73, and claws (claw portions) 723 for preventing falling off that are to be engaged to the engaging holes 823 of the second cover portion 82 are provided to the outer edge portion 721 of the lower vehicle body cover 72. According to this structure, the protector 8 is prevented from falling off from the outer edge portion 75 of the vehicle body cover 7 at which vibration or deformation easily occurs. Further, even if there are not many coupling points between miniaturized covers 71 to 73, the connecting strength is reinforced by the protector 8.

Figure 7:
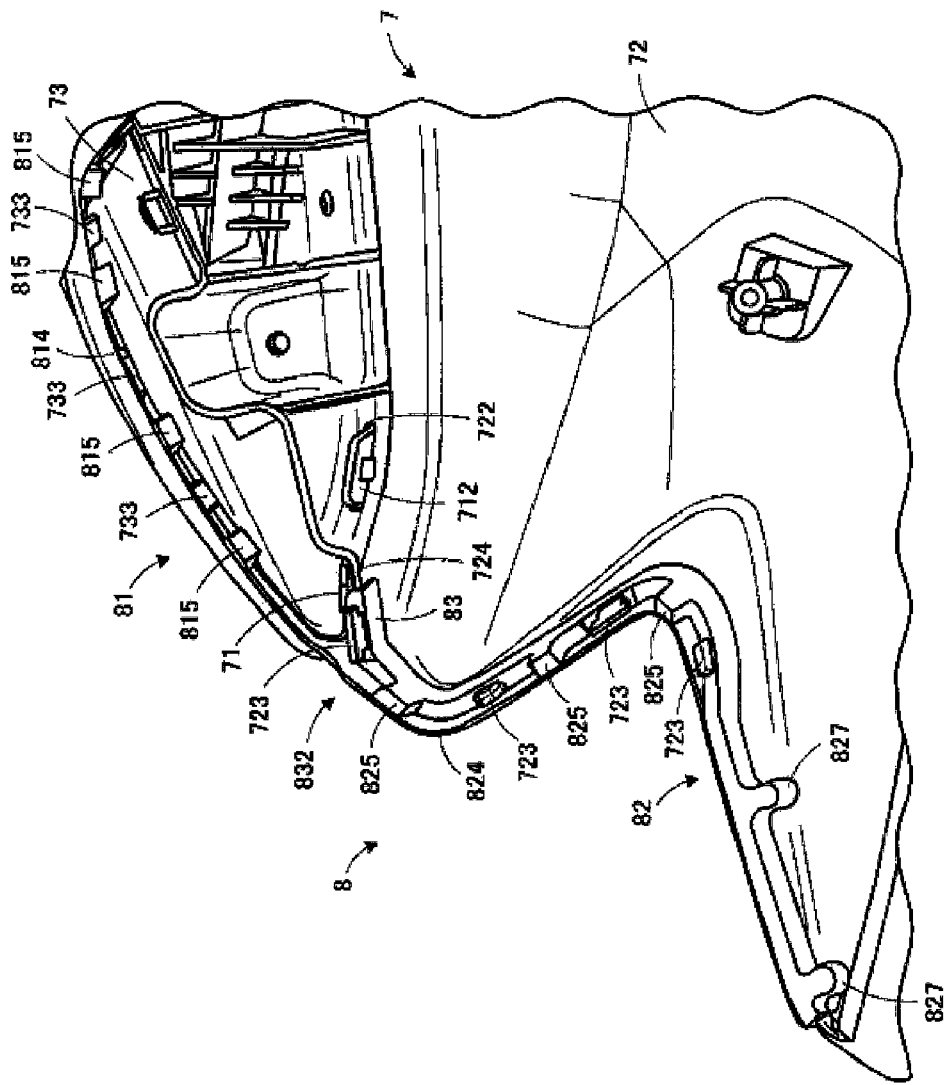
FIG. 7 is an explanatory view, in an enlarged scale, of an attached state of a protector according to the present embodiment to the vehicle body cover.

Referring to FIGS. 7 and 8, the attached state of the protector 8 to the vehicle body cover 7 will be described.

Figure 8A:
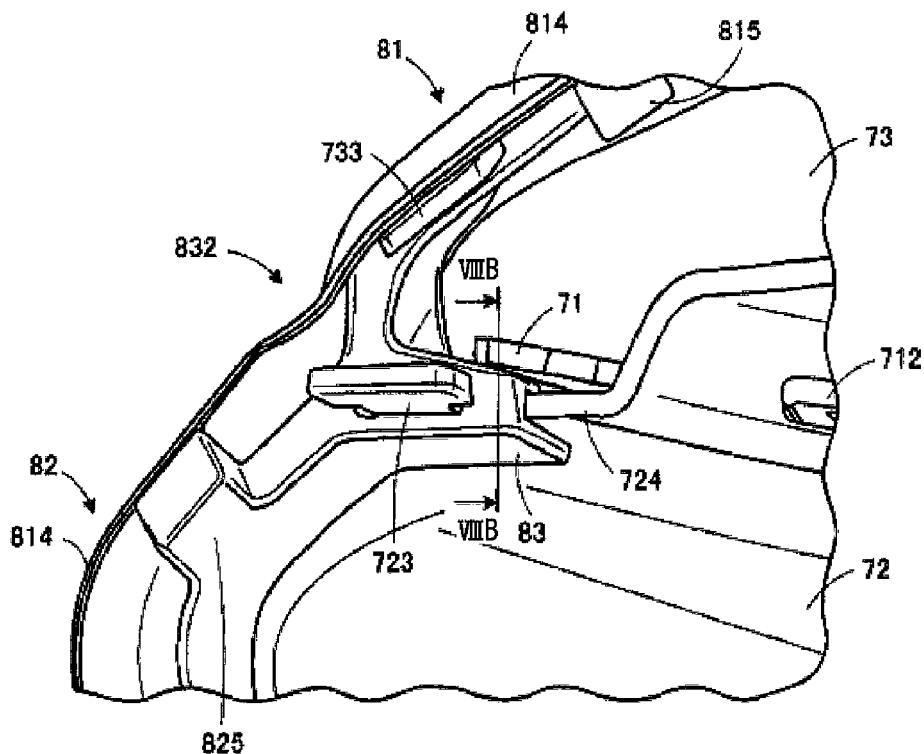
Figure 8B:
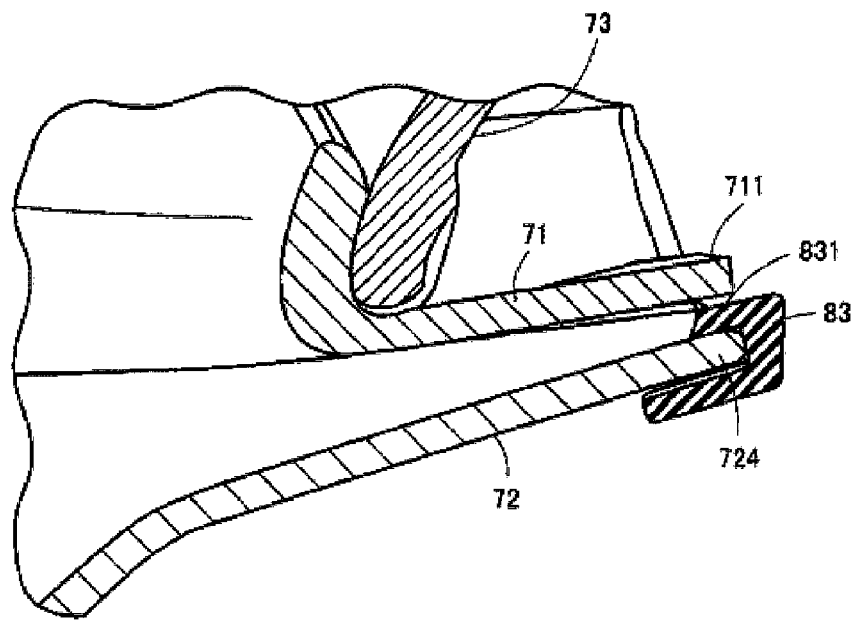

FIG. 7 is an explanatory view of an attached state of the protector 8 to the vehicle body cover 7 according to the present embodiment, and FIGS. 8A and 8B are partial enlarged views of the attached state of the protector 8 to the vehicle body cover 7. Further, FIG. 8A is a partial enlarged view of FIG. 7A, and FIG. 8B is a sectional view taken along line VIIIB-VIIIB in FIG. 8A.

As shown in FIGS. 7 and 8A, the vehicle body cover panel 73, the upper vehicle body cover 71 and the lower vehicle body cover 72 are connected. The first cover portion 81 of the protector 8 is attached to the outer edge portion 731 of the vehicle body cover panel 73, and the second cover portion 82 of the protector 8 is attached to the outer edge portion 721 of the lower vehicle body cover 72. The first and second cover portions 81 and 82 are retained by the claws 733 and 723 for preventing the fall-off thereof. The engaging holes of the first and second cover portions 81 and 82 are formed into long shapes along the strip portions 814 and 824. On the other hand, the claws 733 and 723 are formed into T-shaped plates along the strip portions 814 and 824. The tip portions of the claws 733 and 723 are formed to be larger than the engaging holes 813 and 823, and the base portions of the claws 733 and 723 are formed to have substantially the same dimensions as the engaging holes 813 and 823.

The claws 733 and 723 of the vehicle body cover panel 73 and the lower vehicle body cover 72 are inserted into the engaging holes of the rubber protector 8 by widening the engaging holes. Thus, the protector 8 is prevented from falling off from the vehicle body cover panel 73 and the lower vehicle body cover 72 even if it becomes loose by the vibration or the like.

Furthermore, the claws 733 and 723 are formed into long shapes along the strip portions 814 and 824. According to this structure, when the strip portion 814 or 824 is deformed inward, the deformation of the strip portion 814 or 824 is restricted by the claws 733 or 723 from the inside thereof. Thus, the rigidity of the strip portions 814 and 824 is supported also by the claws 733 and 723, in addition to the provision of the reinforcing portions 815 and 825, the strip portions 814 and 824 can be formed to be wide in accordance with a wide clearance.

The protruding portion 83 of the protector 8 and its periphery are separated from the installation positions of the vehicle body cover panel 73, the upper vehicle body cover 71 and the lower vehicle body cover 72 to the vehicle body frame 2. Accordingly, at the protruding portion 83 and its periphery, the vibration or change in the shape of a member is easily caused at the end portions of the vehicle body cover panel 73, the upper vehicle body cover 71 and the lower vehicle body cover 72. The thick wall 831 of the protruding portion 83 shown in FIG. 5 is interposed between the end portions of the vehicle body cover panel 73 and the lower vehicle body cover 72. In addition, the protruding portion 83 is attached to a partition wall 724 of the lower vehicle body cover 72, and as shown in FIG. 8B, the thick wall 831 of the protruding portion 83 is interposed between the end portions of the lower vehicle body cover 72 and the upper vehicle body cover 71.

According to the structure and arrangement mentioned above, the end portion of the vehicle body cover panel 73 and the end portion of the lower vehicle body cover 72, and the end portion of the lower vehicle body cover 72 and the end portion of the upper vehicle body cover 71 are prevented from directly contacting one another. Thus, abrasion or unpleasant hammering noise caused by the contact of the covers can be effectively suppressed.

Furthermore, at the protruding portion 83 of the protector 8 and its periphery, the external configuration of the outer edge portions 731 and 721 of the vehicle body cover panel 73 and the lower vehicle body cover 72 are formed in such a manner as to be depressed toward the boundary of the vehicle body cover panel 73 and the lower vehicle body cover 72. More particularly, a portion having a concave shape is formed between the arc-shaped outer edge portion 731 of the vehicle body cover panel 73 and the arc-shaped outer edge portion 721 of the lower vehicle body cover 72 in the periphery of the protruding portion 83. Accordingly, the protruding portion 83 of the protector 8 and its periphery are formed into a substantially M-shape so as to be attached along the concave-shaped outer edge portions 731 and 721.

The substantially M-shaped portion 832 is positioned at the connecting portion between the curved end portions of the long first and second cover portions 81 and 82, thus constituting a portion of the protector 8 that is most easily deformed. Therefore, with the protector 8, if the substantially M-shaped portion 832 comes off the vehicle body cover panel 73, the entire protector 8 may fall off from the substantially M-shaped portion 832 as starting point. Thus, according to the present embodiment, the substantially M-shaped portion 832 of the protector 8 is retained (fixed) by the claw 723 (a fixing portion) at the boundary of the vehicle body cover panel 73 and the lower vehicle body cover 72.

According to the present embodiment, as mentioned above, since the substantially M-shaped portion 832, which may be the starting point for falling off, can be retained, the protector 8 is prevented from falling off from the vehicle body cover 7. The coupling condition between the vehicle body cover panel 73, the upper vehicle body cover 71 and the lower vehicle body cover 72 is reinforced by the protector 8 attached or mounted in the manner mentioned hereinbefore, thus being advantageous.

Accordingly, even if the number of coupling points between the components or parts of the vehicle body cover 7 is small, the vibration of each cover portions is reduced by strengthening the coupling strength between the respective components or parts. Furthermore, compared to a structure where the protector 8 is provided individually for each portion of the vehicle body cover 7, the number of members or like may be reduced.

As described above, according to the present embodiment, the outer edge portions of the vehicle body cover panel 73, the upper vehicle body cover 71 and the lower vehicle body cover 72, which are easily vibrated, are connected by the protector 8, and thus, the vibration of the outer edge portion of each part of the vehicle body cover 7 can be effectively suppressed. Accordingly, abrasion or abnormal noise caused by the contact between the components or parts of the vehicle body cover 7 can be suppressed. Moreover, by causing the protector 8 to serve the function of connecting portions, the coupling strength of the parts is increased and the rigidity thereof can be secured even with a small number of coupling points.

It is further to be noted that the present invention is not limited to the embodiment described above, and various changes and modifications may be made upon implementation. The sizes or shapes shown in the accompanying drawings are not restrictive, and the embodiment described above may be modified as appropriate as long as the effects of the present invention can be achieved. Moreover, various modifications may be made without departing from the scopes or sprits of the appended claims.

For example, in the present embodiment, an explanation is given taking the fuel tank 4 as the example of the counterpart of the protector 8, but the counterpart is not limited to the fuel tank 4, and many other cover members or the frame, for example, may be adopted as long as they are located adjacently to the vehicle body cover 7.

Furthermore, in the present embodiment, although the protector 8 is to be attached to the vehicle body cover 7 which is positioned at the front of the vehicle body, the present invention is not limited to such structure, and for example, the protector 8 may be attached to a vehicle body cover such as a seat cowl positioned at the rear portion of the vehicle body.

Furthermore, in the present embodiment, although the protector 8 is formed of rubber, the present invention is not limited to such structure, and the protector 8 may be formed of resin or other materials, for example, as long as the material has a shock-absorbing property or performance.

Still furthermore, in the present embodiment, although the outer edge portion 75 of the vehicle body cover 7 is attached to the attachment grooves 812 and 822 of the protector 8, the present invention is not limited to such structure, and the protector 8 may be attached by means of screw or adhesive, for example, as long as the protector can be attached to the outer edge portion 75 of the vehicle body cover 7.

Still furthermore, in the present embodiment, although the substantially M-shaped portion 832 (the protruding portion 83) is fixed by the claw 723 of the lower vehicle body cover 72, the present invention is not limited to such structure, and the substantially M-shaped portion 832 may be fixed by the claw 733 of the vehicle body cover panel 73. Alternatively, the substantially M-shaped part 832 may be fixed by a claw provided to the upper vehicle body cover 71.

Still furthermore, in the present embodiment, although the protector 8 includes the strip portions 814 and 824, and the reinforcing portions 815 and 825, the present invention is not limited to such structure, and the protector 8 may not be provided with the strip portion 814 and the reinforcing portion 815.

Still furthermore, in the present embodiment, although the protector 8 is attached (that is, mounted so as to straddle) two portions or parts of the vehicle body cover 7, the present invention is not limited to such structure, and the protector 8 may be attached across three or more portions or parts, for example, as long as it is attached across a plurality of vehicle body cover parts.

Still furthermore, in the present embodiment, although the claws 733 and 723 of the vehicle body cover 7 are formed into T-shaped plates, the present invention is not limited to such structure, and the claws (claw portions) 733 and 723 may be formed into L-shaped plates, for example, as long as the claws have shapes capable of being engaged with the protector 8.

What is claimed is:

1. A protector for absorbing shock for a vehicle body cover, that is to be attached to an outer edge portion of the vehicle body cover on an outer side of a vehicle body, wherein the vehicle body cover is composed of a plurality of vehicle body cover parts which are coupled with each other so as to constitute the vehicle body cover, and the protector comprises:
    an attachment portion attached to the vehicle body cover so as to straddle outer edge portions of adjacent vehicle body cover parts among a plurality of vehicle body cover parts, wherein the attachment portion includes:
        a first attachment portion and a second attachment portion which are each attached to respective outer edge portions of the adjacent vehicle body cover parts; and
        a protruding portion formed at a connecting portion between the first and second attachment portions so as to protrude in a direction along a boundary portion of the adjacent vehicle body cover parts,
    wherein the protruding portion is fixed at the boundary portion of the adjacent vehicle body cover parts by a fixing portion provided on one of the vehicle body cover parts of the adjacent vehicle body cover parts.

2. The protector of claim 1, wherein the protruding portion is fixed in a manner to be sandwiched between outer edge portions of the respective adjacent vehicle body cover parts at the boundary portion thereof.

3. The protector of claim 1, wherein the outer edge portions of the adjacent vehicle body cover parts are formed so as to provide an external configuration of the connecting portion of the first and second attachment portions in such a manner as to be recessed toward the boundary portion of the adjacent vehicle body cover parts.

4. The protector of claim 1, wherein a strip portion is provided so as to protrude from the attachment portion towards a side of an opposite member adjacent to the outer edge portion of the vehicle body cover in a manner such that the strip portion covers a portion of a clearance, between the vehicle body cover and the opposite member, extending at least an upper side of the vehicle body.

5. The protector according to claim 4, wherein a reinforcing portion is formed so as to protrude from the attachment portion for partially reinforcing the strip portion.

6. The protector of claim 5, wherein the strip portion protrudes from one end in a width direction perpendicular to the extending direction of the attachment portion, and the reinforcing portion is provided so as to extend from the strip portion toward another end in the width direction of the attachment portion.

7. The protector of claim 6, wherein the one end of the reinforcing portion in the protruding direction has a contact area contacting the opposite member.

8. The protector of claim 7, wherein the strip portion protrudes from one end on an outside of the vehicle body in the width direction of the attachment portion, and the contact area is inclined so as to elongate a protruding length of the reinforcing portion from the outside of the vehicle body to the inside of the vehicle body in the width direction of the attachment portion.

9. The protector of claim 1, wherein the vehicle cover is provided with a claw for fixing the protector, and an engaging hole to be engaged with the claw is formed to the attachment portion.

10. The protector of claim 9, wherein another strip portion is provided so as to protrude from the attachment portion toward the opposite member adjacent to the outer peripheral portion of the vehicle body cover, the strip portion protrudes from one end portion of the outside of the vehicle body in the width direction of the attachment portion, and the claw is engaged along an inside surface of the strip portion.

* * * * *